(12) United States Patent
Kwon et al.

(10) Patent No.: US 11,569,957 B2
(45) Date of Patent: Jan. 31, 2023

(54) METHOD AND APPARATUS FOR TRANSMITTING AND RECEIVING DOWNLINK CONTROL CHANNEL IN SHORTENED TRANSMISSION TIME INTERVALS

(71) Applicant: SAMSUNG ELECTRONICS CO., LTD., Suwon-si (KR)

(72) Inventors: Yangsoo Kwon, Seoul (KR); Joonsung Kim, Hwaseong-si (KR); Yongin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 16/991,567

(22) Filed: Aug. 12, 2020

(65) Prior Publication Data

US 2021/0050973 A1   Feb. 18, 2021

Related U.S. Application Data

(60) Provisional application No. 62/923,698, filed on Oct. 21, 2019, provisional application No. 62/916,445, (Continued)

(30) Foreign Application Priority Data

Dec. 10, 2019   (KR) .................. 10-2019-0164152

(51) Int. Cl.
*H04L 5/00*   (2006.01)
*H04L 1/06*   (2006.01)
*H04L 1/00*   (2006.01)

(52) U.S. Cl.
CPC .......... *H04L 5/0048* (2013.01); *H04L 1/0022* (2013.01); *H04L 1/0038* (2013.01); *H04L 1/0606* (2013.01); *H04L 5/0023* (2013.01)

(58) Field of Classification Search
CPC ... H04L 1/0022; H04L 1/0038; H04L 1/0606; H04L 5/0023; H04L 5/0048
See application file for complete search history.

(56) References Cited

U.S. PATENT DOCUMENTS

| 9,577,806 B2 | 2/2017 | Lee et al. |
| 10,009,880 B2 | 6/2018 | Wang et al. |
| (Continued) | | |

FOREIGN PATENT DOCUMENTS

| KR | 10-2008-0097682 | 11/2008 |
| KR | 10-2019-0008666 | 1/2019 |
| KR | 10-2019-0056437 | 5/2019 |

OTHER PUBLICATIONS

On DL control channel design for shorter TTI operation, Apr. 2017, Nokia, Alcatel-Lucent Shanghai Bell, 3GPP TSG-RAN WG1 Meeting, R1-1704806, pp. 1-9 (Year: 2017).*

*Primary Examiner* — Michael Thier
*Assistant Examiner* — Prince A Mensah
(74) *Attorney, Agent, or Firm* — F. Chau & Associates, LLC

(57) ABSTRACT

A method of receiving a downlink control channel in a user equipment may include receiving, using two or more antenna ports, a shortened physical downlink control channel (PDCCH) transmitted using a space-frequency block code (SFBC), by using at least one shortened control channel element (SCCE) for shortened transmission time interval (STTI) transmission; and monitoring the shortened PDCCH. The at least one SCCE may include at least one shortened resource element group (REG) including a number of resource elements (REs), where the number is unequal to an integer multiple of the number of antenna ports allocated to the shortened PDCCH.

19 Claims, 24 Drawing Sheets

Related U.S. Application Data filed on Oct. 17, 2019, provisional application No. 62/915,732, filed on Oct. 16, 2019, provisional application No. 62/913,826, filed on Oct. 11, 2019, provisional application No. 62/887,781, filed on Aug. 16, 2019.

(56) References Cited

U.S. PATENT DOCUMENTS

| | | |
|---|---|---|
| 2013/0039284 A1 | 2/2013 | Marinier et al. |
| 2014/0086192 A1 | 3/2014 | Kim et al. |
| 2018/0359733 A1* | 12/2018 | Bagheri ................ H04L 5/0051 |
| 2019/0260525 A1 | 8/2019 | Solano et al. |
| 2020/0229270 A1* | 7/2020 | Chatterjee ............. H04W 80/08 |
| 2020/0305129 A1* | 9/2020 | Lee ........................ H04L 1/1812 |
| 2020/0389255 A1* | 12/2020 | Harrison ................... H04L 1/08 |
| 2021/0227512 A1* | 7/2021 | Solano Arenas ..... H04L 5/0082 |

* cited by examiner

BLIND DECODING EXAMPLE:
FIRST SPDCCH CANDIDATE = SCCE1

FIG. 6

|  | y(4i) | y(4i+1) | y(4i+2) | y(4i+3) |
|---|---|---|---|---|
| $y^{(0)}$ | $\frac{1}{\sqrt{2}}x^{(0)}(i)$ | $\frac{1}{\sqrt{2}}x^{(1)}(i)$ | 0 | 0 |
| $y^{(1)}$ | 0 | 0 | $\frac{1}{\sqrt{2}}x^{(2)}(i)$ | $\frac{1}{\sqrt{2}}x^{(3)}(i)$ |
| $y^{(2)}$ | $-\frac{1}{\sqrt{2}}[x^{(1)}(i)]^*$ | $\frac{1}{\sqrt{2}}[x^{(0)}(i)]^*$ | 0 | 0 |
| $y^{(3)}$ | 0 | 0 | $-\frac{1}{\sqrt{2}}[x^{(3)}(i)]^*$ | $\frac{1}{\sqrt{2}}[x^{(2)}(i)]^*$ |

FIG. 8

|  | SREG(k) | | SREG(k+1) | |
|---|---|---|---|---|
|  | y(4i) | y(4i+1) | y(4i+2) | y(4i+3) |
| $y^{(0)}$ | $\frac{1}{\sqrt{2}}x^{(0)}(i)$ | $\frac{1}{\sqrt{2}}x^{(1)}(i)$ | 0 | 0 |
| $y^{(1)}$ | 0 | 0 | $\frac{1}{\sqrt{2}}x^{(2)}(i)$ | $\frac{1}{\sqrt{2}}x^{(3)}(i)$ |
| $y^{(2)}$ | $-\frac{1}{\sqrt{2}}[x^{(1)}(i)]^*$ | $\frac{1}{\sqrt{2}}[x^{(0)}(i)]^*$ | 0 | 0 |
| $y^{(3)}$ | 0 | 0 | $-\frac{1}{\sqrt{2}}[x^{(3)}(i)]^*$ | $\frac{1}{\sqrt{2}}[x^{(2)}(i)]^*$ |

FIG. 9

SPDCCH candidate 1 (CCE1:SREG 4,5,6,7)

| SREG 4:y(0),~y(9) | | | | | |
|---|---|---|---|---|---|
| y(0) | y(1) | y(2) | y(3) | ⋮ | |
| $\frac{1}{\sqrt{2}}x^{(0)}(0)$ | $\frac{1}{\sqrt{2}}x^{(1)}(0)$ | 0 | 0 | | |
| 0 | 0 | $\frac{1}{\sqrt{2}}x^{(2)}(0)$ | $\frac{1}{\sqrt{2}}x^{(3)}(0)$ | | |
| $-\frac{1}{\sqrt{2}}[x^{(1)}(0)]^*$ | $\frac{1}{\sqrt{2}}[x^{(0)}(0)]^*$ | 0 | 0 | | |
| 0 | 0 | $-\frac{1}{\sqrt{2}}[x^{(3)}(0)]^*$ | $\frac{1}{\sqrt{2}}[x^{(2)}(0)]^*$ | | |

→ $y^{(0)}(i)$
→ $y^{(1)}(i)$
→ $y^{(2)}(i)$
→ $y^{(3)}(i)$

SPDCCH candidate 2 (CCE0,1:SREG 0,4,1,5,2,6,3,7)

| SREG 0:y(0),~y(9) | | | | SREG 4:y(10),~y(19) | | | |
|---|---|---|---|---|---|---|---|
| y(6) | y(7) | y(8) | y(9) | y(10) | y(11) | y(12) | y(13) |
| 0 | 0 | $\frac{1}{\sqrt{2}}x^{(0)}(2)$ | $\frac{1}{\sqrt{2}}x^{(1)}(2)$ | $\frac{1}{\sqrt{2}}x^{(2)}(2)$ | $\frac{1}{\sqrt{2}}x^{(3)}(2)$ | 0 | 0 |
| $\frac{1}{\sqrt{2}}x^{(2)}(1)$ | $\frac{1}{\sqrt{2}}x^{(3)}(1)$ | 0 | 0 | 0 | 0 | $\frac{1}{\sqrt{2}}x^{(0)}(3)$ | $\frac{1}{\sqrt{2}}x^{(1)}(3)$ |
| 0 | 0 | $-\frac{1}{\sqrt{2}}[x^{(1)}(2)]^*$ | $\frac{1}{\sqrt{2}}[x^{(0)}(2)]^*$ | $-\frac{1}{\sqrt{2}}[x^{(3)}(2)]^*$ | $\frac{1}{\sqrt{2}}[x^{(2)}(2)]^*$ | 0 | 0 |
| $-\frac{1}{\sqrt{2}}[x^{(3)}(1)]^*$ | $\frac{1}{\sqrt{2}}[x^{(2)}(1)]^*$ | 0 | 0 | 0 | 0 | $-\frac{1}{\sqrt{2}}[x^{(1)}(3)]^*$ | $\frac{1}{\sqrt{2}}[x^{(0)}(3)]^*$ |

→ $y^{(0)}(i)$
→ $y^{(1)}(i)$
→ $y^{(2)}(i)$
→ $y^{(3)}(i)$

METHOD AND APPARATUS FOR TRANSMITTING AND RECEIVING DOWNLINK CONTROL CHANNEL IN SHORTENED TRANSMISSION TIME INTERVALS

CROSS-REFERENCE TO RELATED APPLICATIONS

This application claims the benefit of U.S. Provisional Application No. 62/887,781, filed on Aug. 16, 2019, No. 62/913,826, filed on Oct. 11, 2019, No. 62/915,732, filed on Oct. 16, 2019, No. 62/916,445, filed on Oct. 17, 2019 and No. 62/923,698, filed on Oct. 21, 2019, in the U.S. Patent and Trademark Office, and Korean Patent Application No. 10-2019-0164152, filed on Dec. 10, 2019, in the Korean Intellectual Property Office, the disclosures of which are incorporated herein by reference in their entireties.

TECHNICAL FIELD

This disclosure relates to generally wireless communication, and more particularly, to a method and apparatus for transmitting and receiving a downlink control channel in shortened transmission time intervals.

DISCUSSION OF THE RELATED ART

A wireless communication system may employ various methods such as a super-high frequency band, beamforming, an array antenna, and the like for a high data throughput. In addition, a wireless communication system may employ a transmission time interval (TTI) that is shorter than that of legacy systems to reduce latency of data transmission. Latency of data transmission may be related to the quality of services provided to final users and may be important in machine type communication (MTC). Accordingly, ongoing efforts are made to reduce latency of data transmission in wireless communication systems.

SUMMARY

Embodiments of the inventive concept provide a method and an apparatus for high quality transmission and reception of downlink control channel in a wireless communication system employing a shortened transmission time interval.

According to an aspect of the inventive concept, there is provided a method of receiving a downlink control channel in a user equipment, the method including: receiving, using two or more antenna ports, a shortened physical downlink control channel (PDCCH) transmitted using a space-frequency block code (SFBC), by using at least one shortened control channel element (SCCE) for shortened transmission time interval (STTI) transmission; and monitoring the shortened PDCCH. The at least one SCCE includes at least one shortened resource element group (REG) including a number of resource elements (REs), which is unequal to an integer multiple of the number of antenna ports allocated to the shortened PDCCH.

According to another aspect of the inventive concept, there is provided a method of receiving a downlink control channel in a user equipment, the method including: receiving, using two or more antenna ports, a shortened physical downlink control channel (PDCCH) transmitted using a space-frequency block code (SFBC), by using at least one shortened control channel element (CCE) for shortened transmission time interval (TTI) transmission; and monitoring the shortened PDCCH, where the at least one shortened CCE includes a first shortened resource element group (REG) and a second shortened REG the first and second shortened REGs each including resource elements (REs) simultaneously precoded by a precoding matrix for the SFBC and being adjacent to each other.

According to another aspect of the inventive concept, there is provided a method of transmitting a downlink control channel in a base station, the method including: precoding data for a shortened physical downlink control channel (PDCCH), based on a precoding matrix for a space-frequency block code (SFBC) using two or more antenna ports; and transmitting the shortened PDCCH by using at least one shortened control channel element (CCE) for shortened transmission time interval (STTI) transmission, wherein the at least one shortened CCE includes at least one shortened resource element group (REG) including a number of resource elements (REs), which is unequal to an integer multiple of the number of antenna ports, allocated to the shortened PDCCH.

According to another aspect of the inventive concept, there is provided a method of transmitting a downlink control channel in a base station, the method including: performing precoding for shortened physical downlink control channel (PDCCH) transmission, based on a precoding matrix for a space-frequency block code (SFBC) using two or more antenna ports; and transmitting the shortened PDCCH by using at least one shortened control channel element (CCE) for shortened transmission time interval (STTI) transmission, wherein the at least one shortened CCE includes a first shortened resource element group (REG) and a second shortened REG each comprising resource elements (REs) simultaneously precoded by a precoding matrix for the SFBC and being adjacent to each other.

According to another aspect of the inventive concept, there is provided a method of transmitting a downlink control channel in a base station, the method including: performing precoding for shortened physical downlink control channel (PDCCH) transmission, based on a precoding matrix for a space-frequency block code (SFBC) using two or more antenna ports; mapping precoded data to resource elements (REs); and transmitting the shortened PDCCH by using at least one shortened control channel element (SCCE) for shortened transmission time interval (STTI) transmission, wherein the mapping includes mapping the precoded data to REs such that the at least one shortened CCE only includes shortened resource element groups (REGs) allocated to a number of the shortened PDCCHs, wherein the number of the shortened REs allocated to the shortened PDCCHs is identical to an integer multiple of the number of antenna ports.

Other aspects of the present disclosure provide wireless communication devices, UEs and base stations that implement the above-noted methods.

BRIEF DESCRIPTION OF THE DRAWINGS

Embodiments of the inventive concept will be more clearly understood from the following detailed description taken in conjunction with the accompanying drawings in which:

FIG. 6 is a diagram showing an example of a pre-coding operation according to an example embodiment of the inventive concept;

FIG. 8 is a diagram showing an example of a precoding operation on a physical downlink control channel.

FIG. 9 is a diagram showing examples of candidates of a shortened physical downlink control channel in blind decoding, according to an example embodiment of the inventive concept;

DETAILED DESCRIPTION OF EMBODIMENTS

Figure 1:
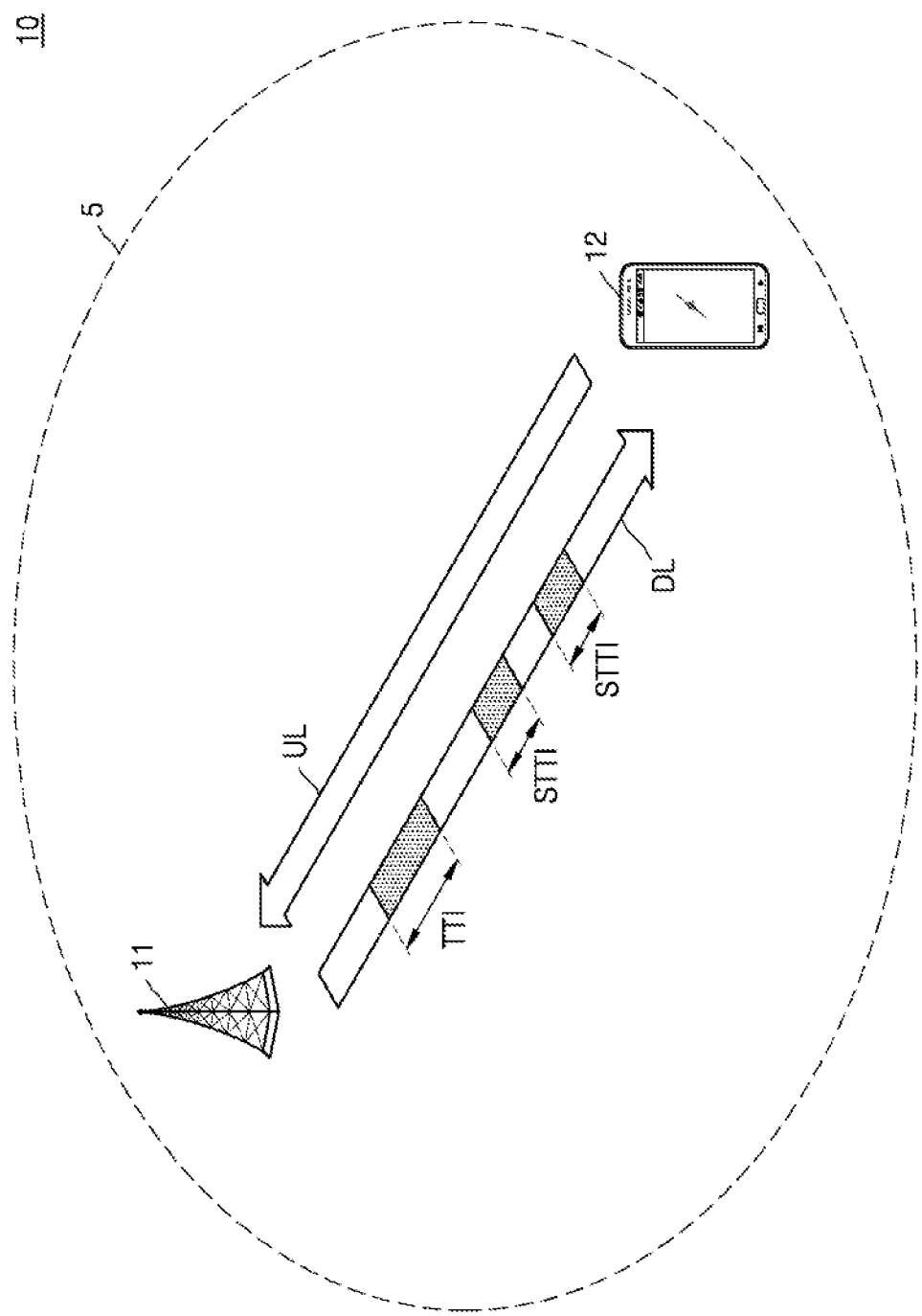
FIG. 1 shows an example of a wireless communication system according to an example of the inventive concept.

FIG. 1 shows an example of a wireless communication system according to an example embodiment of the inventive concept. As shown in FIG. 1, a wireless communication system 10 may include a base station 11 and a user equipment (UE) 12. Although not shown in FIG. 1, the wireless communication system 10 may further include a core network including the base station 11. As non-limiting examples, the wireless communication system 10 may be a wireless communication system using a cellular network, for example, a 5th generation wireless (5G) new radio (NR) system, a long term evolution (LTE) system, an LTE-advanced (LTE-A) system, a code division multiple access (CDMA) system, and a global system for mobile communications (GMS) system, or alternatively, a Wireless Personal Area Network (WPAN) system or another arbitrary wireless communication system. Hereinafter, the wireless communication system 10 will be described as a wireless communication system using a cellular network mainly with reference to an LTE system or an LTE-A system. However, it will be understood that example embodiments of the inventive concept are not limited thereto.

The base station 11 may include a communication coverage for a coverage region 5 and wirelessly communicate with the UE 12 via at least one antenna. The base station 11 may be a fixed station communicating with the user equipment 12 and/or other base stations, and may exchange data and control information by communicating with the UE (12) and/or other base stations. For example, the base station 11 may also be referred to as a Node B, an evolved-Node B (eNB), a Next generation Node B (gNB), a sector, a site, a Base Transceiver System (BTS), an Access Point (AP), a Relay Node, a Remote Radio Head (RRH), a Radio Unit (RU), a small cell, and the like. Herein, the terms "base station" or "cell" may be sometimes be used to indicate a region or a function covered by a base station controller (BSC) of CDMA, a Node-B of WCDMA, an eNB in an LTE/LTE-A system, and a gNB or a sector (a site) of 5G, and may encompass all of various coverage regions such as a mega-cell, a macro cell, a micro cell, a picocell, a femtocell, a relay node, an RRH, an RU, a small cell communication range, and the like.

The UE 12 may be fixed or mobile, and may be any device that transmits and receives data and/or control information in communication with a base station, for example, the base station 11. For example, the UE 12 may be referred to as a terminal, a terminal equipment, a Mobile Station (MS), a Mobile Terminal (MT), a User Terminal (UT), a Subscriber Station, a wireless device, a handheld device, and the like. Hereinafter, example embodiments of the inventive concept will be described as wireless communication devices mainly with reference to the UE 12. However, it will be understood that the example embodiments of the inventive concept are not limited thereto.

A wireless communication network between the UE 12 and the base station 11 may support communication of multiple users by sharing available network resources. For example, in the wireless communication network, information may be delivered in various multiple access methods such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Orthogonal Frequency Division Multiplexing (OFDM)-FDMA, OFDM-TDMA, OFDM-CDMA, and the like. As shown in FIG. 1, the UE 12 may communicate with the base station 12 through uplink UL and downlink DL. In some embodiments, UEs may communicate with one another through a sidelink, as in the Device-to Device (D2D) technology.

The base station 11 may provide control information and/or data to the UE 12 on downlink DL, and the UE 12 may provide control information and data to the base station 11 on uplink UL. Control information and/or data may be scheduled in a transmission time interval (TTI) on the uplink UL and the downlink DL. A TTI may be an interval of a minimum unit of information transmission. In some embodiments, as will be described later with reference to FIG. 2, a radio frame used in the wireless communication system 10 may include a plurality of subframes, and a time period for transmitting one subframe may be defined as a TTI. For example, as shown in FIG. 1, the base station 11 may provide a radio resource corresponding to a TTI to the UE 12 through a carrier signal on the downlink DL.

A time period from a point at which a signal is transmitted by the base station 11 to a point at which the base station 11 receives an acknowledgement (ACK)/a negative-acknowledgement (NACK) transmitted by the UE 12 in response to the received signal may include: downlink propagation delay; a processing time period (for example, a buffering time period, a decoding time period, an ACK/NACK preparation time period, and the like) in which the signal is processed in the UE 12 to generate ACK/NACK; uplink propagation delay; over the air delay due to a retransmission margin; and the like. To decrease latency in the wireless communication, the wireless communication system 10 may define a shortened TTI, and scheduled control information and/or data may be transmitted in the shortened TTI. Herein, a shortened TTI may be expressed as a shorter TTI, a short TTI, or more simply as an STTI. A TTI may alternatively be called a normal TTI, a subframe TTI, a legacy TTI, and the like. For example, as shown in FIG. 1, the base station 11 may provide the radio resource corresponding to the STTI to the UE 12 through the carrier signal on the downlink DL.

The wireless communication system 10 may define downlink physical channels, which correspond to resource elements carrying information originated from a higher layer, and downlink physical signals that correspond to resource elements which are used by physical layers but do not carry information originated from the higher layer. For example, the wireless communication system 10 may define a physical downlink shared channel (PDSCH), a physical broadcast channel (PBCH), a physical multicast channel (PMCH), a physical control format indicator channel (PCFICH), a physical downlink control channel (PDCCH) and a physical hybrid ARQ indicator channel (PHICH) as downlink physical channels, and may also define a reference signal (RS) and a synchronization signal as downlink physical signals. The RS may also be referred to as a pilot, or may indicate a predefined specific signal known to the base station 11 and the UE 12. For example, the RS may include a cell specific RS (CRS), a UE-specific RS (UE-RE), a positioning RS (PRS), and a channel state information RS (CSI-RS).

In addition, the wireless communication system 10 may define uplink physical channels, which correspond to resource elements carrying information originated from higher layers, and may also define uplink physical signals corresponding to resource elements that are used by physical layers but do not carry the information originated from the higher layers. For example, the wireless communication system 10 may define a physical uplink shared channel (PUSCH), a physical uplink control channel (PUCCH), and a physical random access channel (PRACH) as uplink physical channels, and may define a demodulation reference signal (DMRS) for an uplink control/data signal and a sounding reference signal (SRS) used for measuring the uplink channels as uplink physical signals.

Herein, the PDCCH, the PCICH, the PHICH, and the PDSCH may each be transmitted over a group of time-frequency resources or a group of resource elements (REs) each carrying downlink control information (DCI), a control format indicator (CFI), a downlink ACK/NACK, and/or downlink data. Similarly, the PUCCH, the PUSCH, and the PRACH may each be transmitted over a group of time-frequency resources or a group of resource elements each carrying uplink control information (UCI), uplink data, and/or a random access signal. A time-frequency resource or resource element allocated to or included in each of the above-mentioned channels may be referred to as a resource or resource element (RE) of the corresponding channels. Herein, transmission of control information and/or data by the base station 11 on the PDCCH, DCI, PHICH, or PDSCH may be simply referred to as transmitting the PDCCH, PCICH, PHICH, or PDSCH. Similarly, transmission of control information and/or data by the UE 12 on the PUCCH, PSUCH, and PRACH may be simply referred to as transmitting the PUCCH, PUSCH, and PRACH.

As described hereinafter, example embodiments of the inventive concept may enable high quality transmission and reception of downlink control channels, for example, a PDCCH, in an STTI. reduction of latency in wireless communication through use of STTIs may be effectively achieved, and downlink transmission and reception to which STTIs are applied may be efficiently performed. In addition, it is noted that a method of transmitting and receiving downlink control channels described below may be applied not only to an LTE/LTE-A system but also to other wireless communication systems defined by different standards.

Figure 2:
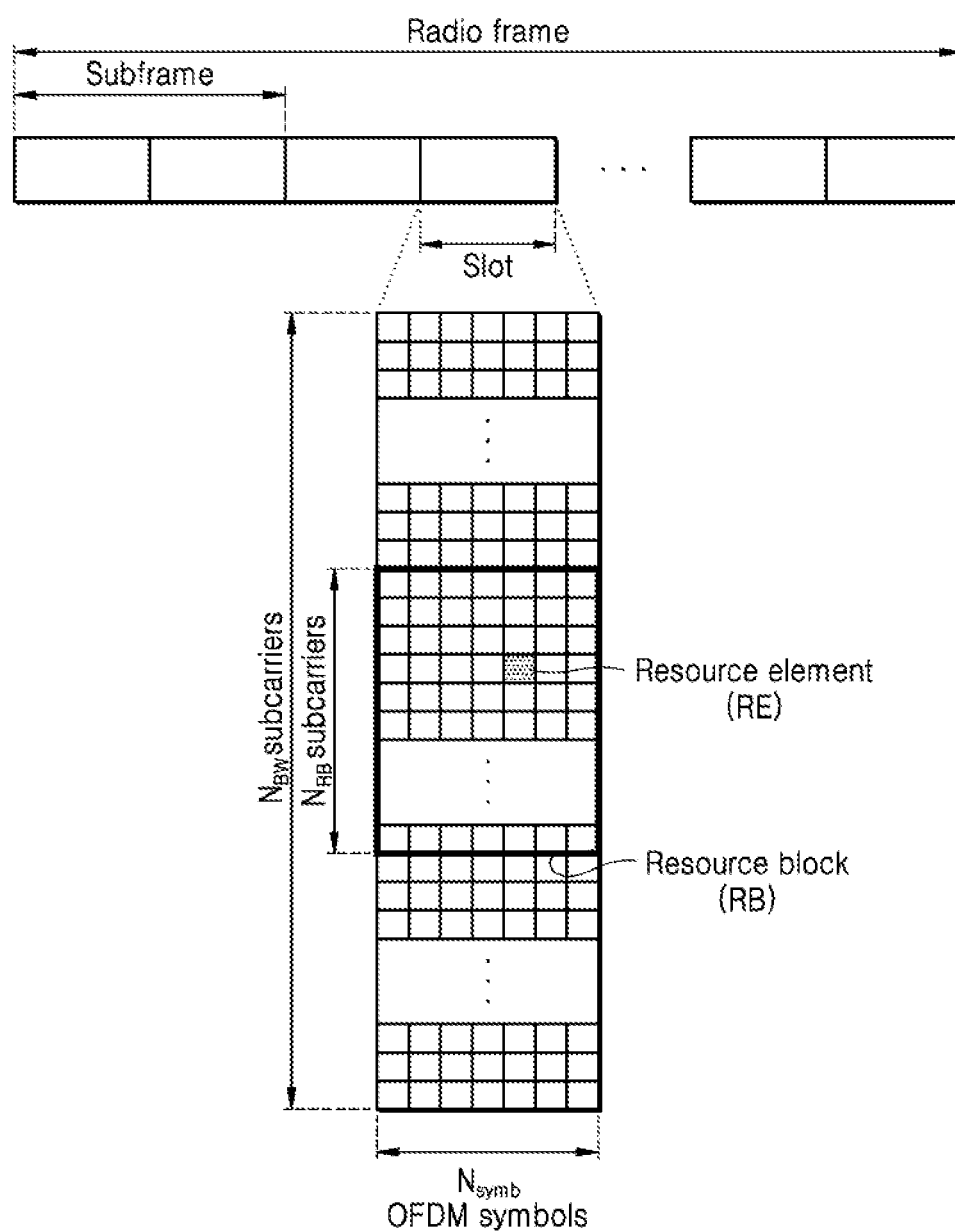
FIG. 2 is a diagram of a structure of a slot in a wireless communication system, according to an example embodiment of the inventive concept.

FIG. 2 is a diagram of a structure of a slot in a wireless communication system, according to an example embodiment of the inventive concept. In FIG. 2, a horizontal axis indicates a time domain, and a vertical axis indicates a frequency domain. In the time domain, a minimum transmission unit may be an OFDM symbol, $N_{symb}$ OFDM symbols may form one slot, and two slots may form one subframe. A slot may have a length of 0.5 ms, and a subframe may have a length of 1.0 ms. Hereinafter, FIG. 2 will be described with reference to FIG. 1.

A radio frame may be a time domain section including ten subframes. A minimum transmission unit in the frequency domain is a subcarrier. A bandwidth of a transmission band of the entire system may include $N_{BW}$ subcarriers. In a time-frequency domain, a basic unit of a resource may be indexed as a resource element (RE) by an OFDM symbol index and a subcarrier index. A resource block (RB) may be defined with $N_{symb}$ contiguous OFDM symbols in the time domain and $N_{RB}$ contiguous subcarriers in the frequency domain. Accordingly, as shown in FIG. 2, one RB may include $N_{symb} \times N_{RB}$ REs. In an LTE/LTE-A system, generally, $N_{symb}$ may be 7, $N_{RB}$ may be 12, and $N_{BW}$ and $N_{RB}$ may be proportional to a bandwidth of a system transmission band. A data transmission rate ("data rate") with respect to a UE 12 may increase in proportion to the number of RBs scheduled in the UE 12.

Figure 3A:
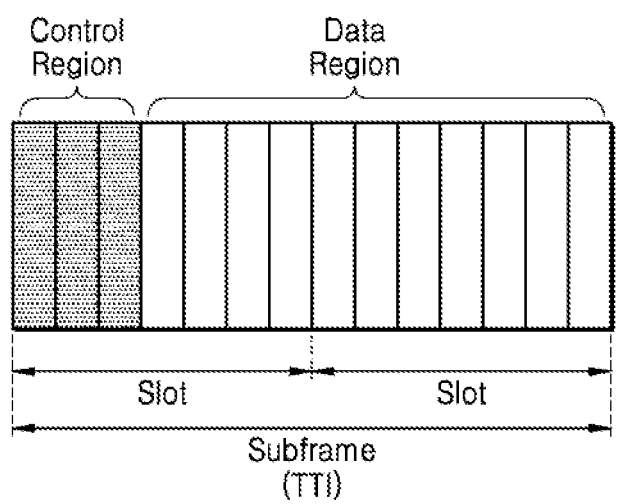
FIGS. 3A and 3B are diagrams of examples of a structure of a downlink subframe in wireless communication, according to example embodiments of the inventive concept.
Figure 3B:
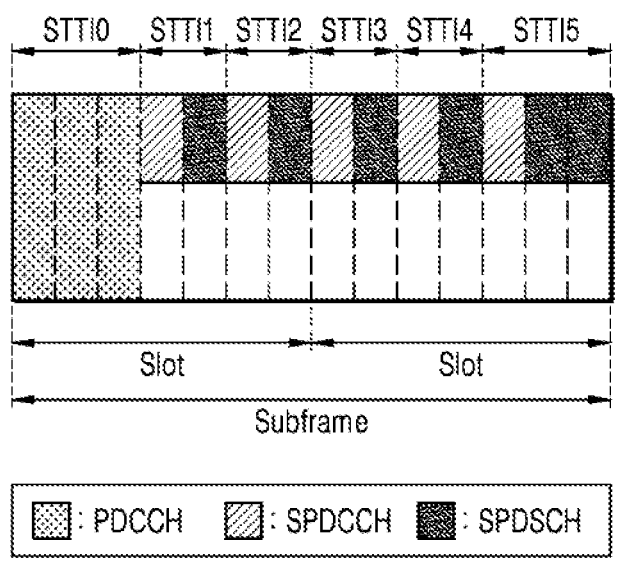

FIGS. 3A and 3B are diagrams of examples of a structure of a downlink subframe in a wireless communication system, according to example embodiments of the inventive concept. Particularly, FIG. 3A shows an example of a subframe scheduled according to TTI, and FIG. 3B shows an example of a subframe scheduled according to STTI. Hereinafter, redundant descriptions of FIGS. 3A and 3B will be omitted, and FIGS. 3A and 3B will be described with reference to FIG. 1.

Referring to FIG. 3A, the subframe may be divided into a control region and a data region in the time domain. Three (or four) OFDM symbol sections arranged in a head portion of a first slot of the subframe may correspond to the control region to which a control channel, for example, a PDCCH, is allocated. Moreover, other symbol sections of the subframe may correspond to the data region to which a data channel, for example, a PDSCH, is allocated. Data of a PCFICH control channel may be transmitted from a first OFDM symbol of the subframe, and may carry information regarding the number of OFDM symbols used for transmission of the control channel in the subframe. Data of a physical hybrid-ARQ indicator channel (PHICH) may carry a hybrid automatic repeat request (HARQ) acknowledge (ACK)/negative-acknowledge (NACK) signal in response to uplink transmission.

The PDCCH control channel may carry downlink control information (DCI). DCI may include resource allocation information and other control information for the UE 12 or a UE group. DCI carried by one PDCCH may have different sizes and uses, depending on the format used, and where the sizes may vary according to coding rates. For example, an LTE/LTE-A system defines a plurality of formats for downlink, and according to DCI formats, a combination including selected control information such as flag-hopping, RB allocation, modulation coding scheme (MCS), redundancy version (RV), new data indicator (NDI), transmit power control (TPC), cyclic shift demodulation reference signal (cyclic shift DMRS), uplink (UL) index, channel quality information (CQI) request, downlink (DL) assignment index, HARQ process number, transmitted precoding matrix indicator (TPMI), precoding matrix indicator (PMI), and the like may be provided as the DCI from the base station 11 to the UE 12.

The base station 11 may transmit a plurality of PDCCHs in the control region, and the UE 12 may monitor the plurality of PDCCHs and may eventually use one of the PDCCHs after decoding attempts on the plurality of PDCCHs. The base station 11 may determine DCI formats according to the DCI to be transmitted to the UE 12 and add cyclic redundancy check (CRC) to the DCI. CRC may be masked (or scrambled) as an identifier, for example, a radio network temporary identifier (RNTI), according to an owner or a purpose of the PDCCH, for example, a predefined user equipment, a paging message, system information, a random access response, and the like. CRC masking (or scrambling) may include, for example, performing a bitwise XOR operation on CRC and RNTI. The DCI formats that may be transmitted to the UE 12 may vary according to transmission modes (TMs) set in the UE 12. The UE 12 may attempt decoding of the PDCCH by only using a DCI format corresponding to the TM of the UE 12 itself.

The PDCCH may be transmitted by using a single control channel element (CCE) or an aggregation of multiple CCEs. A CCE may be a logical allocation unit used for providing a coding rate based on a wireless channel state to the PDCCH. A CCE may be composed of a plurality of resource element groups (REGs). For example, each CCE may include nine REGs, where each of the nine REGs may be scattered over one, two, three, or four OFDM symbols and a system bandwidth through interleaving for interference reduction and diversity. One REG may correspond to, e.g., four resource elements (REs), and four Quadrature Phase Shift Keying (QPSK) symbols may be mapped to one REG. An RE occupied (allocated or mapped) by an RS may not be included in an REG, and accordingly, the number of REGs for a given set of OFDM symbols may vary due to existence and the number of RSs. The PCFICH and the PHICH may also each include an REG in a similar way. The number and a power level of CCEs used for transmission of the PDCCH may be determined by a network or the base station 11 according to the state of a channel between the base station 11 and the UE 12. For example, if the downlink channel is in a relatively better state, the number of CCEs used for transmission of the PDCCH may decrease. For example, an LTE/LTE-A system defines the number of CCEs corresponding to formats of the PDCCH, as shown in [Table 1] (clause 6.8.1 of 3GPP TS 36.211 V15.50 (2019-05), hereafter just "3GPP TS 36.211" for brevity).

TABLE 1

| PDCCH format | Number of CCEs | Number of SREGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

For each user equipment including the UE 12, a set of CCEs in which the PDCCH may be located may be defined. A group of CCEs in which the UE 12 may find the PDCCH of the UE 12 may be referred to as a PDCCH search space (SS), or more simply, as an SS. In addition, in the SS, an individual resource through which the PDCCH may be transmitted may be referred to as a PDCCH candidate. The wireless communication system may define a UE-specific search space (USS) as an exclusive search space and a common search space (CSS) for a plurality of pieces of user equipment, and may define aggregation levels corresponding to the USS and the CSS.

The base station 11 may transmit DCI on an arbitrary PDCCH candidate in the SS, and the UE 12 may monitor a set of PDCCH candidates to find the DCI. The monitoring by the UE 12 may refer to attempted decoding on the PDCCH candidates in a corresponding SS according to all of the monitored DCI formats. The UE 12 may detect a PDCCH assigned to the UE 12 itself by monitoring the PDCCH candidates. The UE 12, which has not determined a position to which the PDCCH of the UE 12 is transmitted, may attempt decoding all of the PDCCH candidates of a corresponding DCT format until each subframe detects a PDCCH having its own identifier. This process may be referred to as blind decoding (or blind detection).

Referring to FIG. 3B, the subframe may include a plurality of STTIs. For example, as shown in FIG. 3B, OFDM symbol sections in the subframe may be split into STTIs STTI0 through STTI5 in the time domain. In the STTI, a shortened PDCCH for scheduling of data may be hereafter referred to as a shorter PDCCH, a short PDCCH, or more simply, as SPDCCH. A PDCCH may be interchangeably called a normal PDCCH, a legacy PDCCH, or the like. As shown in FIG. 3B, the PDCCH may be arranged in a first one of the STTIs of the subframe. In addition, in the subsequent STTIs of the subframe, a shortened physical downlink shared channel (SPDSCH) may be arranged (after the PDCCH). Note that head OFDM symbol sections shown as a first STTI STTI0 in FIG. 3B, during which legacy control channels are transmitted may alternatively be called a TTI rather than an STTI. Compared to the example shown in FIG. 3A regarding a subframe comprised of legacy TTIs, in the example shown in FIG. 3B, due to STTI, information may be transmitted faster in a shortened time period; a response for the transmitted information may also be transmitted in a shortened time period; and as a result, latency in wireless communication may be reduced. To reduce such latency, the UE 12 may be configured to rapidly and efficiently perform decoding on the SPDCCH.

Figure 4A:
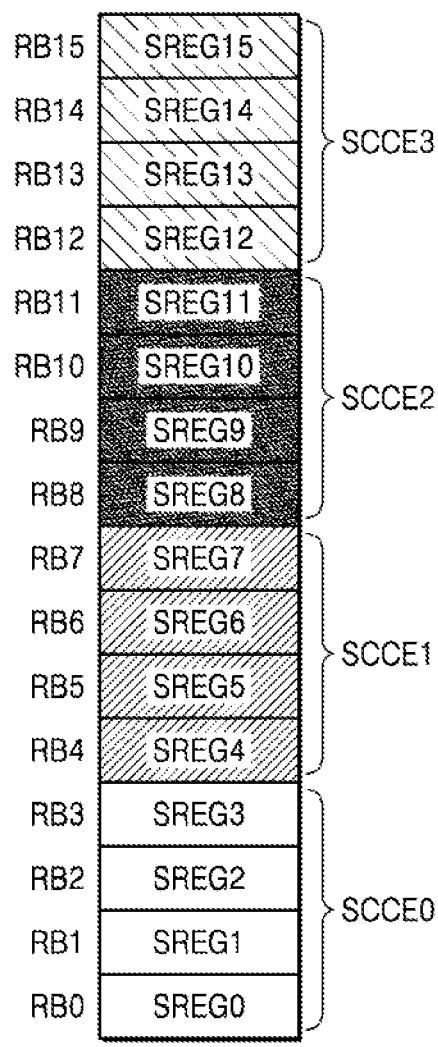
FIGS. 4A, 4B and 4C show examples of a search space of a physical downlink control channel, according to example embodiments of the inventive concept.
Figure 4B:
Figure 4C:

FIGS. 4A through 4C show examples of the SS in the SPDCCH, according to example embodiments of the inventive concept. Particularly, FIG. 4A shows an example of resource allocation of the SPDCCH, and FIG. 4B and FIG. 4C show examples of the SPDCCH candidates.

In a similar fashion to that of the PDDCH, the SPDCCH may be transmitted by using an aggregation of contiguous shortened CCEs. Herein, a shortened CCE may be interchangeably called a "shorter CCE", a "short CCE", and the like, or just an "SCCE". A CCE that is not an SCCE may be interchangeably called a "normal CCE", a "legacy CCE", or the like. An SCCE may be a logical allocation unit used for providing a coding rate based on a wireless channel state to the SPDCCH. An SCCE may correspond to a plurality of short REGs (SREGs). For example, an LTE/LTE-A system defines the number of SREGs $N_{SREG}^{SCCE}$ as in [Table 2] below, and also defines formats of the SPDCCH and the number of SCCEs $N_{SCCE}^{SPDCCH}$ corresponding thereto, as in [Table 3] below (clause 6.8C.1 of 3GPP TS 36.211).

TABLE 2

|  | $N_{SREG}^{SCCE}$ |
|---|---|
| CRS-based SPDCCH | 4 |
| DMRS-based SPDCCH | 4 for a 2-symbol SPDCCH |
|  | 6 for a 3-symbol SPDCCH |

TABLE 3

| SPDCCH format | $N_{SCCE}^{SPDCCH}$ |
|---|---|
| 0 | 1 |
| 1 | 2 |
| 2 | 4 |
| 3 | 8 |

Accordingly, in a CRS-based SPDCCH, when a format of SPDCCH is 2, SPDDCH may include four short CCEs SCCE0 through SCCE3 as shown in FIG. 4A, and the four short SCCEs SCCE0 through SCCE3 may each include four short SREGs (for example, SREG0 through SREG3).

The UE 12 may monitor a plurality of SPDCCH candidates by blind decoding. For example, as shown in FIG. 4B, a first SPDCCH candidate may have aggregation level one and include one SCCE, e.g., the second SCCE, SCCE1. In addition, as shown in FIG. 4C, a second SPDCCH candidate may have aggregation level two and include first and second SCCEs, SCCE0 and SCCE1.

Figure 5:
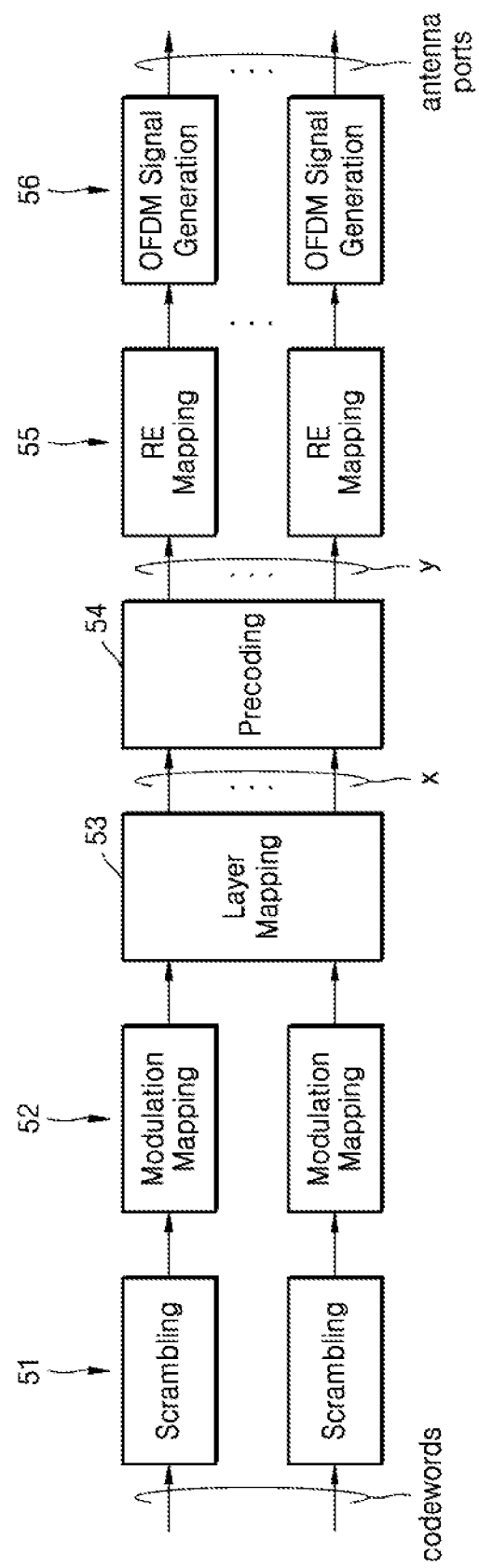
FIG. 5 is a block diagram schematically showing physical channel processing operations, according to an example embodiment of the inventive concept.

FIG. 5 is a block diagram schematically showing physical channel processing operations, according to an example embodiment of the inventive concept. In some embodiments, operations shown in FIG. 5 may be performed in the base station 11 shown in FIG. 1. While FIG. 5 illustrates specific types of operations performed separately, in other embodiments at least two of the shown types of operations may be performed in combination. Hereinafter, FIG. 5 will be described with reference to FIG. 1.

In a first operation 51, codewords may undergo scrambling. For example, coded bits may be scrambled in each of the codewords to be transmitted on a physical channel. In a second operation 52, the scrambled bits may undergo modulation. For example, modulation may be performed on the coded bits to generate complex-valued modulation symbols. In a third operation 53, the modulated symbols may be mapped to at least one transmission layer. For example, the complex-valued modulation symbols for each of the codewords to be transmitted may be mapped to one or more transmission layers. In a fourth operation 54, an output y may be generated by precoding an input x. For example, the output y may be generated by precoding the complex-valued modulation symbols on each transmission layer as input x for transmission on the antenna ports. In a fifth operation 55, the modulated symbols may be mapped to REs. For example, the complex-valued modulation symbols for each antenna port may be mapped to the REs. In a sixth operation 56, an OFDM signal may be generated. For example, a complex-valued domain OFDM signal may be generated for each antenna port.

SPDCCH signals are an example of signals that may be transmitted using the operations of FIG. 5. Regarding RE mapping of the SPDCCH, an LTE/LTE-A system prescribes that symbols of the output y of the fourth operation 54, that is, the precoding, are to be mapped to an even number of REs in an RB (clause 6.8C.5 of 3GPP TS 36.211). Accordingly, the SREG may be configured by an even number of REs, and two REs adjacent to each other may be precoded together.

FIG. 6 is a diagram showing an example of a pre-coding operation according to an example embodiment of the inventive concept. As described above with reference to FIG. 5, in the fourth operation 54, the output y may be generated by precoding the input x. Hereinafter, FIG. 6 will be described with reference to FIG. 5.

For a space-frequency block code (SFBC) in the LTE/LTE-A system, a CRS-based SPDCCH may be transmitted via two antenna ports (e.g., p∈{0,1}) or four antenna ports (p∈{0,1,2,3}). SFBC coding is a transmit diversity scheme in which encoding is done in antenna/frequency domains rather than in antenna/time domains (as in Alamouti coding). The fourth operation 54 of FIG. 5, that is, the precoding, may be performed by a precoder. An input x of the precoder may be represented as a block of vectors $x(i)=[x^{(0)}(i) \ldots x^{(3)}(i)]^T$ (i=0, 1, ..., $M_{symb}^{layer}$-1). An output y of the precoder may be represented as vectors $y(i)=[y^{(0)}(i) \ldots y^{(P-1)}(i)]^T$ (i=0, 1, ... $M_{symb}^{ap}$-1). The precoder may perform precoding using a precoding matrix W(i) having a size of P×v, as shown in [Equation 1] below (i=0, 1, ..., $M_{symb}^{ap}$-1, $M_{symb}^{ap}=M_{symb}^{layer}$).

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(v-1)}(i) \end{bmatrix} \quad \text{[Equation 1]}$$

Accordingly, in an example of four antenna ports (p∈{0, 1,2,3}), precoded outputs may be generated as shown in FIG. 6.

Figure 7A:
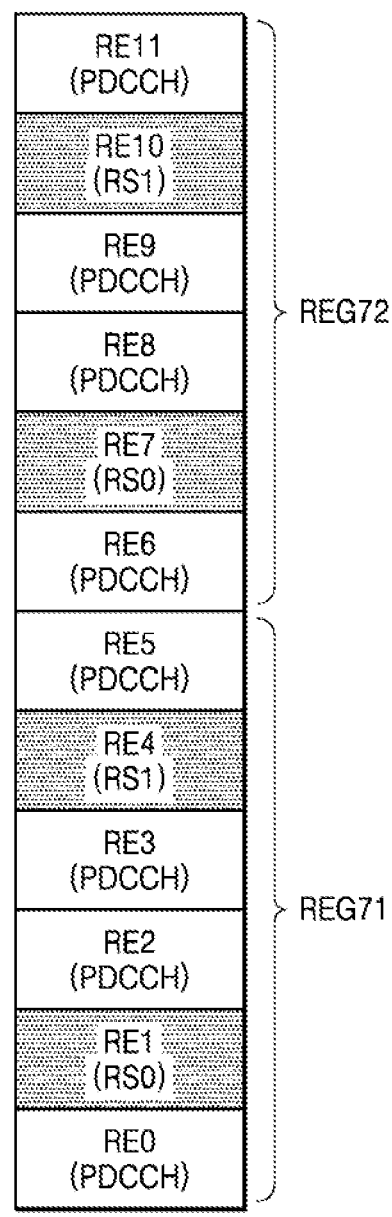
FIGS. 7A and 7B show examples of a resource element group according to an example embodiment of the inventive concept.
Figure 7B:
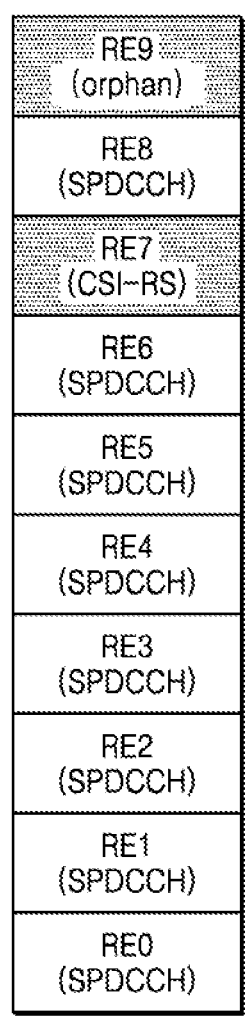

FIGS. 7A and 7B show examples of REGs according to example embodiments of the inventive concept. Particularly, FIG. 7A shows examples of a REG, and FIG. 7B shows an example of an SREG including the REGs allocated to an even number of SPDCCHs, where the even number does not equal an integer multiple of a number "J" of antenna ports of the UE 12 allocated for receiving SPDCCH (hereafter, just "J" or "the number of antenna ports"). As described above with reference to FIGS. 3A and 3B, REs occupied by the RS may not be allocated to the SPDCCH. Accordingly, a given OFDM symbol of the PDCCH or the SPDCCH may be mapped to an RE that is not occupied by an RS, for example, a DMRS, a CRS, and a CSI-RS.

Referring to FIG. 7A, first and second example REGs REG71 and REG72 are shown. In some embodiments, RS elements are distributed among REGs in a regular pattern. For example, an RS RS0 for antenna port zero and an RS RS1 for antenna port one may be mapped to the REs in every third RE among adjacent REGs as shown in FIG. 7A. Accordingly, in each of the first and second REGs REG71 and REG72, the PDCCH may be mapped to four REs to which the RS is not allocated (RE0, RE2, RE3, etc.).

Referring to FIG. 7B, the SREG may be configured by REs allocated to an even number of SPDCCHs, as described above with reference to FIG. 5. Here, the even number need not be a multiple of J. For example, when a channel state information reference signal (CSI-RS) is configured for three antenna ports, e.g., antenna ports one, two, and four, in subslots two, four, and five, as shown in FIG. 7B, the number of REs that may be allocated to the SPDCCH may not be an integer multiple of four due to two REs including RE7 occupied by the CSI-RS and RE9 remained as an orphan (in the discussion hereafter, "multiple" refers to an integer multiple). Accordingly, the SREG may be configured by a number of REs allocated to the SPDCCHs, where the number of REs is not a multiple of J. The SREG configured by the REs allocated to the SPDCCHs, where the number of REs is not a multiple of J, may be generated not only in a subslot-based mode but also in a slot-based mode. Hereinafter, the REs allocated to the SPDCCHs in the SREG may be simply referred to as REs of the SREG.

FIG. 8 is a diagram showing an example of an SPDCCH precoding operation according to an example embodiment of the inventive concept, and FIG. 9 is a diagram showing examples of SPDCCH candidates in blind decoding, according to an example embodiment of the inventive concept. Particularly, FIG. 8 illustrates precoding for transmitting the SPDCCH through four antenna ports, and FIG. 9 illustrates blind decoding for receiving the SPDCCH.

When the number of REs constructing an SREG for four antenna ports is not a multiple of four, precoding may be performed as shown in FIG. 8 in adjacent SREGs SREG(k) and SREG(k+1). This precoding may occur as at a boundary between of the SREGs SREG(k) and SREG(k+1). Here, a portion of a preceding SREG SREG(k) and a portion of a subsequent SREG(k+1) may be simultaneously precoded by a precoding matrix. Accordingly, as shown in FIG. 8, y(4i) and y(4i+1) may be precoded for antenna port zero and antenna port two, whereas y(4i+2) and y(4i+3) may be precoded for antenna port one and antenna port three. Thus, a transmission diversity gain may be obtained by precoding two antenna ports for two REs each.

Referring to FIG. 9, for the UE 12 to adequately receive the SPDCCH, regardless of the configuration of the SREG, the UE 12 may consider different mappings of REs in each of the SPDCCH candidates. For example, the UE 12 may consider both precoding as in FIG. 6 and precoding as in FIG. 8 for the SPDCCH candidates while performing blind decoding. For example, as described above with reference to FIG. 4B, the first SPDCCH candidate may be defined in the order of "SREG4," "SREG5," "SREG6," and "SREG7" due to the aggregation level one and the second SCCE SCCE1. In addition, as described above with reference to FIG. 4C, the second SPDCCH candidate may be defined in the order of "SREG0," "SREG4," "SREG1," "SREG5," "SREG2," "SREG6," "SREG3," and "SREG7" due to the aggregation level two and the first and second SCCEs SCCE0 and SCCE1. Accordingly, with respect to the first and SPDCCH candidates, precoding such as shown in FIG. 9 may be assumed, and thus, blind decoding may be performed. Accordingly, regarding first two REs of "SREG4", it is considered that transmission diversity precoding is applied to the antenna port zero and antenna port two in the first SPDCCH candidate, on the other hand, it is considered that transmission diversity precoding is applied to the antenna port one and antenna port three in the second SPDCCH candidate. Due to antenna port flipping described above, the UE 12 performs blind decoding based on precodings that are differently applied to each SPDCCH candidate. Particularly, under a condition of necessarily applying SPDCCH interleaving, the blind decoding described above by the UE 12 may frequently occur. Hereinafter, example embodiments of the inventive concept for processing the above-stated situations will be described with reference to FIGS. 7B, 8, and 9. Note that antenna port flipping may occur not only in localized type aggregations shown in FIGS. 4A through 4C but also in a distributed type aggregation.

Figure 10:
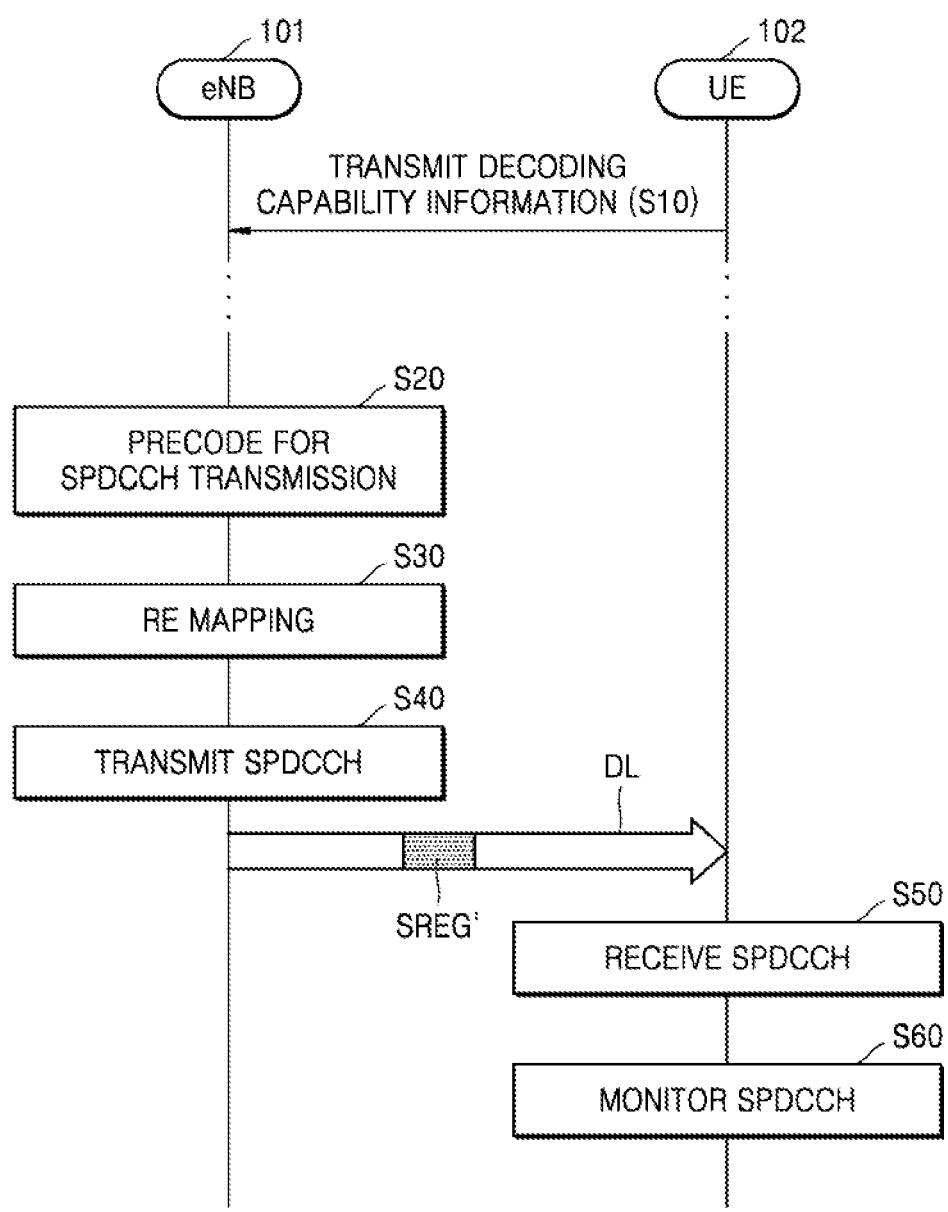
FIG. 10 is a flowchart of a method of transmitting and receiving a downlink control channel in a shortened transmission time interval, according to an embodiment of the inventive concept.

FIG. 10 is a flowchart of a method of transmitting and receiving a downlink control channel in an STTI, according to an example embodiment of the inventive concept. In operation S10, a UE 102 (an example of the UE 12) may transmit decoding capability information to a base station 101 (an example of the base station 11). For example, the UE 102 may transmit, on the UL, information including whether the SREG including the number of REs is able to be processed, where the number of REs is different from a multiple of the number of antenna ports. In some embodiments, the base station 101 may transmit the SPDCCH based on capability signaling of the UE 102. Note that in other embodiments, operation S10 may be omitted.

In operation S20, the base station 101 may perform precoding for SPDCCH transmission. For example, the base station 101 may perform precoding for SPDCCH transmission, based on a precoding matrix for a spatial frequency block code (SFBC) using two or more antenna ports. In operation S30, the base station 101 may perform RE mapping. For example, the base station 101 may allocate SPDCCH to REs that are not occupied by the RS. Accordingly, as described above with reference to FIG. 7B, an SREG including a number of REs may be generated, where the number differs from a multiple of the number J of antenna ports, e.g., a multiple of four. For instance, for two SREGs each including REs simultaneously precoded by a precoding matrix for the SFBC, the two SREGs that are adjacent to each other ("continuous" or "contiguous") may be generated. In operation S40, the base station 101 may transmit the SPDCCH. Accordingly, as shown in FIG. 10, an SREG including a number of REs may be transmitted as a radio resource to the UE 102 on downlink, where the number of REs is different from a multiple of the number of antenna ports. Hereinafter, the SREG' refers to an SREG including a number of REs, wherein the number of REs is different from a multiple of the number of antenna ports.

In operation S50, the UE 102 may receive the SPDCCH. For example, through four antenna ports, the UE 102 may receive the SPDCCH by using at least one SCCE in the STTI. Next, in operation S60, the UE 102 may monitor the SPDCCH. That is, the UE 102 may perform blind decoding with respect to the SPDCCH. The UE 102 may decode the SPDCCH candidates and the situation described above with reference to FIG. 9 may occur due to the SREG'. Examples of operation S60 will be described later with reference to FIGS. 11 and 13.

In other embodiments, in operation S60, the UE 102 may not consider the SREG' and decode an entire region of the SPDCCH allocated by a higher layer signal.

Figure 11:
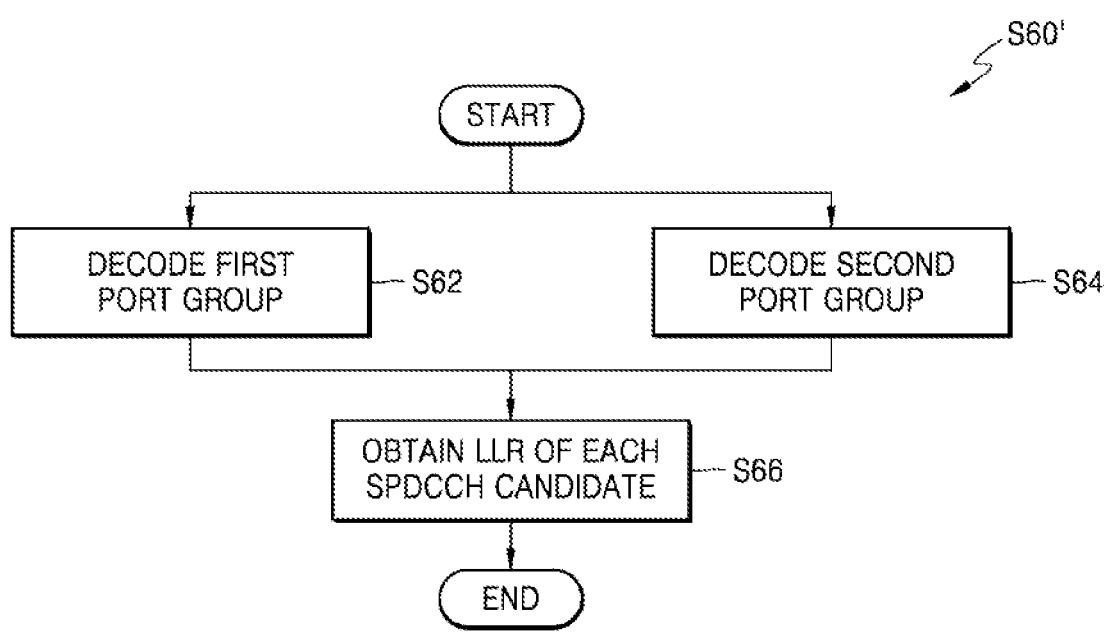
FIG. 11 is a flowchart of a method of receiving a downlink control channel in a shortened transmission time interval, according to an example embodiment of the inventive concept.

FIG. 11 is a flowchart of a method of receiving a downlink control channel in the STTI, according to an example embodiment of the inventive concept. Particularly, FIG. 11 shows an example of operation S60 shown in FIG. 10. As described above with reference to FIG. 10, in operation S60' of FIG. 11, the UE 102 may monitor the SPDCCH. The UE 102 may decode a first port group in operation S62 and concurrently or sequentially decode a second port group in operation S64. For example, in operation S62, the UE 102 may perform space frequency block code (SFBC) decoding for every two REs for all of the SPDCCH candidates with respect to a first port group, e.g., (p∈{0,2}) of the four antenna ports (p∈{0,1,2,3}). In addition, in operation S94, the UE 102 may perform SFBC decoding for every two REs for all of the SPDCCH candidates with respect to a second, different port group, e.g., (p∈{1,3}) of the four antenna ports (p∈{0,1,2,3}). When operations S62 and S64 are completed, a log likelihood ratio (LLR) for a combination of the first port group and the second port group for all of the REs of the SPDCCH candidates may be obtained. Herein, the decoding in operation S62 may be referred to as first decoding, and the decoding in operation S64 may be referred to as second decoding.

In operation S66, the UE 102 may obtain an LLR of each of the SPDCCH candidates. For example, the UE 102 may detect the number of REs included in the SREG from each of the SPDCCH candidates, based on the RE occupied by the RS. Accordingly, the UE 102 may select and obtain some of values of LLRs generated in operation S62 and operation S64, based on the REs and a port group of each of the SPDCCH candidates.

Figure 12:
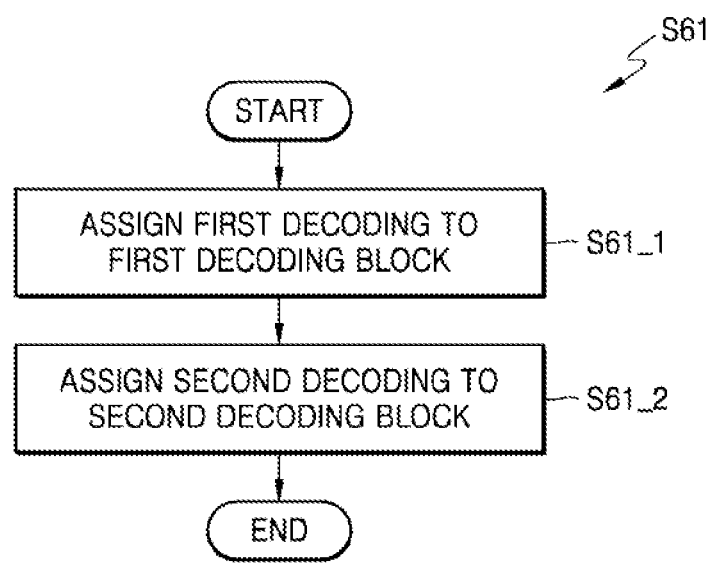
FIG. 12 is a flowchart of a method of receiving a downlink control channel in a shortened transmission time interval, according to an example embodiment of the inventive concept.

FIG. 12 is a flowchart of a method of receiving a downlink control channel in the STTI, according to an example embodiment of the inventive concept. In some embodiments, operation S61 shown in FIG. 12 may be included in operation S60 of FIG. 10 and performed before operation S62 and operation S64 of FIG. 11. As shown in FIG. 12, operation S61 may include operation S61_1 and operation S61_2, and FIG. 12 will be described with reference to FIGS. 10 and 11.

Referring to FIG. 12, in operation S61_1, the UE 102 may assign the first decoding to a first decoding block, and in operation S61_2, the UE 102 may assign the second decoding to a second decoding block. The UE 102 may include a plurality of decoding blocks corresponding to a plurality of carriers to support carrier aggregation (CA). Accordingly, as described above with reference to FIG. 7B, when the SPDCCH based on the SREG' is received, the UE 102 may assign the first decoding, that is, operation S62 of FIG. 11, to the first decoding block, and assign the second decoding, that is, operation S64 of FIG. 11, to the second decoding block. For example, the UE 102 may copy a carrier component A, to which an STTI is allocated, to another carrier component B that is available. Accordingly, decoding may be performed on the first port group (e.g., p∈{0,2}) in the carrier component A, and decoding may be performed on the second port group (e.g., p∈{1,3}) in the carrier component B. By doing so, the first decoding and the second decoding may be processed in parallel, and the efficiency of blind decoding may be improved.

Figure 13:
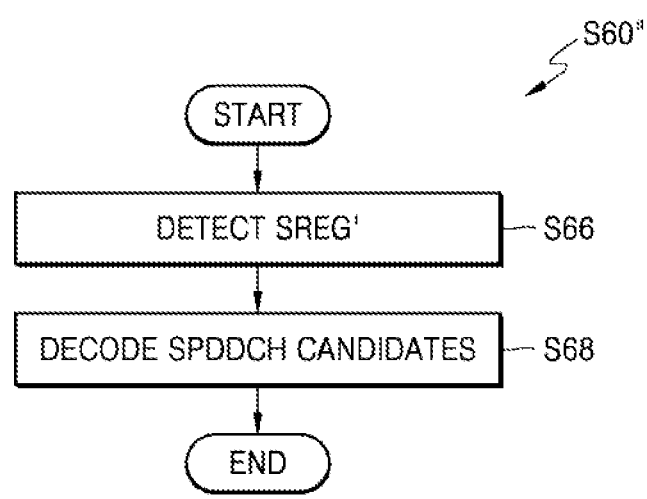
FIG. 13 is a flowchart of a method of receiving a downlink control channel in a shortened transmission time interval, according to an example embodiment of the inventive concept.

FIG. 13 is a flowchart of a method of receiving a downlink control channel in the STTI, according to an example embodiment of the inventive concept. Particularly, the flowchart shown in FIG. 13 shows an example of operation S60 shown in FIG. 10. As described above with reference to FIG. 10, in operation S60" of FIG. 13, an operation of monitoring the SPDCCH may be performed. As shown in FIG. 13, operation S60" may include operation S66 and operation S68. Hereinafter, FIG. 13 will be described with reference to FIG. 10.

Referring to FIG. 13, in operation S66, the UE 102 may detect an SREG'. In some embodiments, in operation S66, the UE 102 may also detect an SCCE including the SREG'. For example, the UE 102 may detect whether the SREG' is generated in the SPDCCH candidates, based on the REs occupied by the RS. In some embodiments, in the CRS-based subslot SPDCCH transmission via four antenna ports, when an SREG in which one RE has different antenna ports included in the SPDCCH candidates, the UE 102 may determine that the SREG' is generated. In some embodiments, in the CRS-based subslot SPDCCH transmission via four antenna ports, the UE 102 may determine that the SREG' is generated. In some embodiments, in the CRS-based subslot SPDCCH transmission via four antenna ports, when different antenna ports are allocated to one RE, the UE 102 may determine that the SREG' is generated.

In operation S68, the UE 102 may decode the SPDCCH candidates. For example, the UE 102 may decode the SPDCCH candidates based on a result of the detection in operation S66. Examples of operation S68 will be described later with reference to FIGS. 14A through 14D.

FIGS. 14A through 14D are flowcharts showing respective methods of receiving downlink control channels in the STTI, according to example embodiments of the inventive concept. Particularly, the flowcharts in FIGS. 14A through 14D show examples of operation S68 in FIG. 13. As described above with reference to FIG. 13, in operations S68a through S68d of FIGS. 14A through 14D, the UE 102 may decode the SPDCCH candidates based on a result of detecting the SREG'.

Figure 14A:
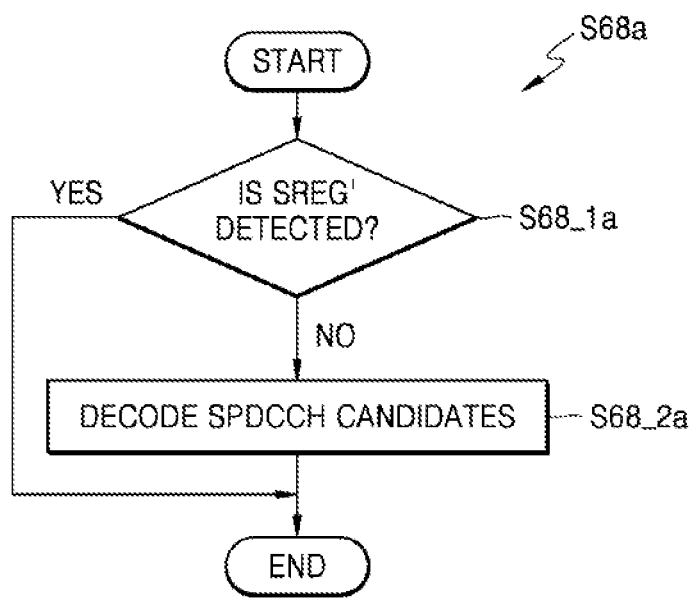
FIGS. 14A, 14B, 14C and 14D are flowcharts showing respective methods of receiving a downlink control channel in a shortened transmission time interval, according to example embodiments of the inventive concept.

Referring to FIG. 14A, operation S68a may include operation S68_1a and operation S68_2a. In operation S68_1a, it may be determined whether the SREG' is detected. As shown in FIG. 14A, when the SREG' is not detected, the UE 102 may perform decoding on the SPDCCH candidates in operation S68_2a. On the other hand, when the SREG' is detected, performing operation S68_2a may be omitted as shown in FIG. 14A. For example, when the SREG' is detected, the UE 102 may omit decoding with respect to an entire portion of SPDCCH allocated by the higher layer signal. In some embodiments, the UE 102 may perform a channel estimating process and a symbol detecting process, both including LLR calculation. However, a channel decoder included in the UE 102 may ignore the provided LLR and not perform decoding.

Figure 14B:
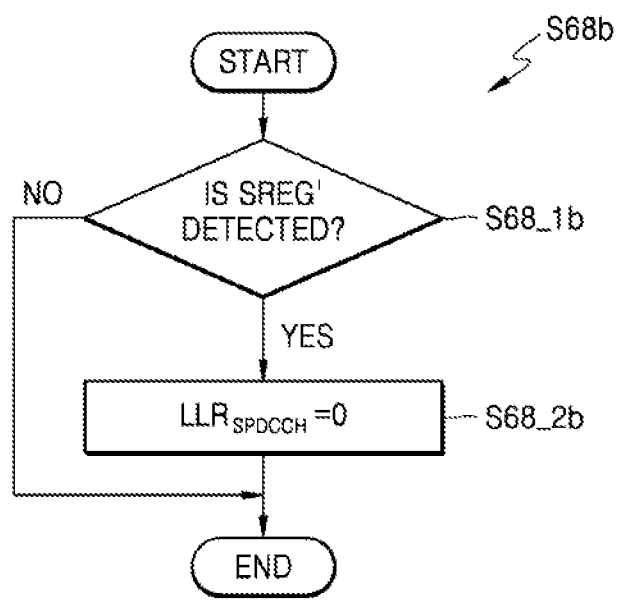

Referring to FIG. 14B, operation S68b may include operation S68_1b and operation S68_2b. In operation S68_1b, it may be determined whether the SREG' is detected. As shown in FIG. 14B, when the SREG' is detected, the UE 102 may set a value of the LLR of the SPDCCH as zero ($LLR_{SPDCCH}=0$) in operation S68_2b. For example, when the SREG' is detected, the UE 102 may provide zero to a channel decoder as the LLR of the SPDCCH in the channel estimating process or the symbol detecting process, and the channel decoder may perform decoding based on the provided LLR of zero. On the other hand, when the SREG' is not detected, the SPDCCH candidates may be normally decoded.

Figure 14C:
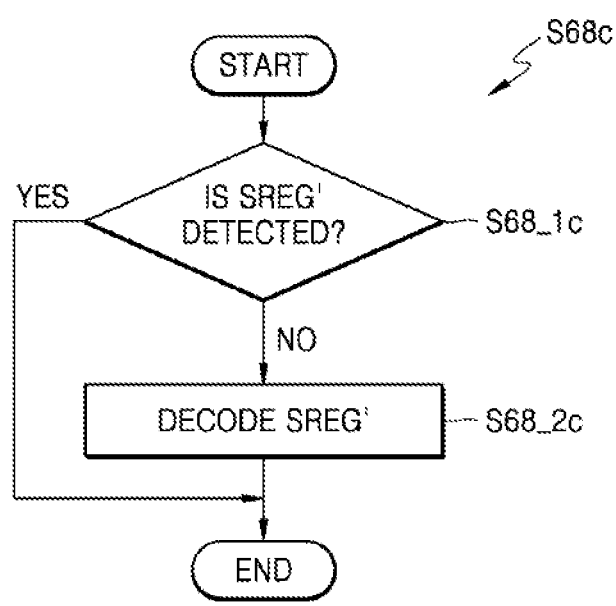

Referring to FIG. 14C, operation S68c may include operation S68_1c and operation S68_2c. In operation S68_1c, it may be determined whether the SREG' is detected. As shown in FIG. 14C, when the SREG' is not detected, the UE 102 may perform decoding on the SREG' in operation S68_2c. On the other hand, when the SREG' is detected, performance of operation S68_2c may be omitted as shown in FIG. 14C. For example, when the SREG' is detected, the UE 102 may omit demapping and/or decoding of the SREG' in the SPDCCH allocated by the higher layer signal. In some embodiments, the UE 102 may perform the channel estimating process and the symbol detecting process, both including LLR calculation. However, the channel decoder included in the UE 102 may ignore the provided LLR of the SREG' and not perform decoding.

Figure 14D:
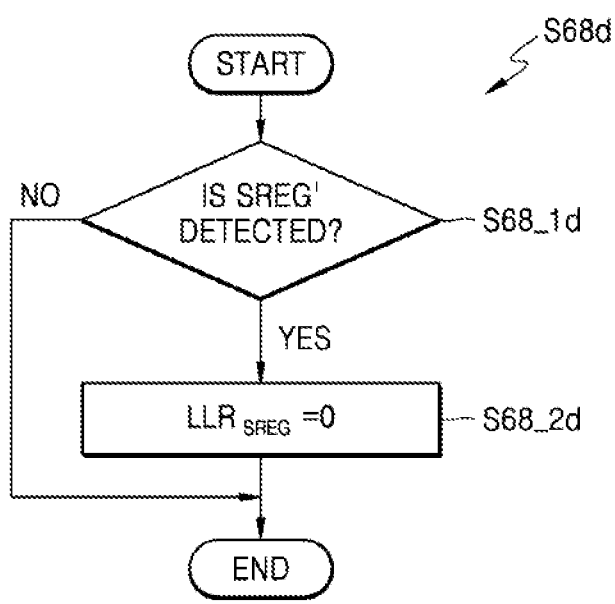

Referring to FIG. 14D, operation S68d may include operation S68_1d and operation S68_2d. In operation S68_1d, it may be determined whether the SREG' is detected. As shown in FIG. 14D, when the SREG' is detected, the UE 102 may set a value of the LLR of the SREG' as zero ($LLR_{SREG}=0$) in operation S68_2d. For example, when the SREG' is detected, the UE 102 may provide zero to the channel decoder as the LLR of the SREG' in the channel estimating process or the symbol detecting process, and the channel decoder may perform decoding on the provided LLR of zero. On the other hand, when the SREG' is not detected, the SPDCCH candidates may be normally decoded.

Figure 15:
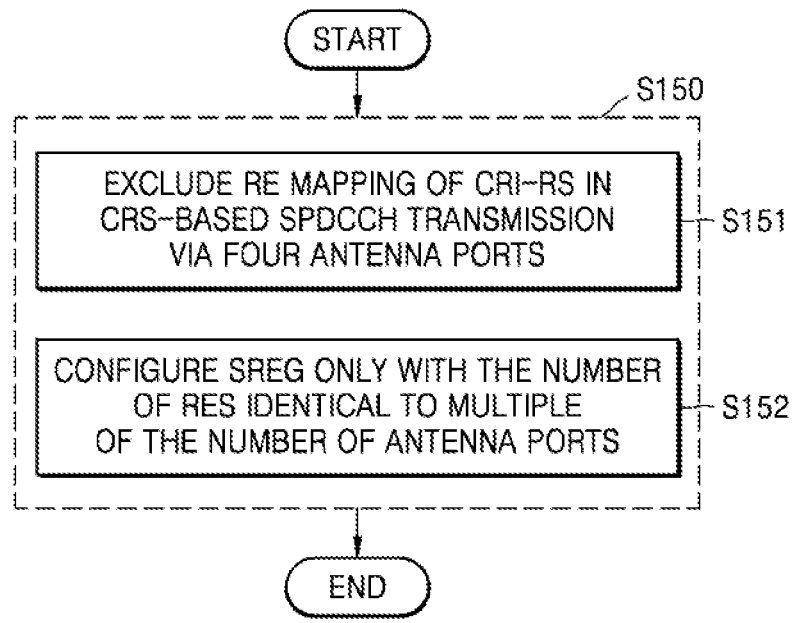
FIG. 15 is a flowchart of a method of transmitting a downlink control channel in a shortened transmission time interval, according to an example embodiment of the inventive concept.

FIG. 15 is a flowchart of a method of transmitting a downlink control channel in an STTI, according to an example embodiment of the inventive concept. Particularly, FIG. 15 shows operation S150 of mapping REs for SPDCCH transmission, and by performing operation S150, the number of REs of the SREG may be maintained as a multiple of the number of antenna ports. As shown in FIG. 15, operation S150 in FIG. 15 may include operation S151 and operation S152. In some embodiments, operation S150 may include only one of operation S151 and operation S152. In some embodiments, operations in FIG. 15 may be performed by the base station 11 shown in FIG. 1. Hereinafter, FIG. 15 will be described with reference to FIG. 1.

In operation S151, the base station 11 may exclude RE mapping of the CSI-RS in CRS-based SPDCCH transmission via four antenna ports. Accordingly, as described above with reference to FIG. 7B, due to the RE of the CSI-RS, generation of the SREGs including a number of REs may be prevented, where the number of REs is different from a multiple of the number of antenna ports, e.g., a multiple of four.

In operation S152, the base station 11 may configure the SREG only with a number of REs, wherein the number is identical to a multiple of the number of antenna ports. In some embodiments, when the number of available REs in the SPDDCH is not equal to a multiple of the number of antenna ports, the base station 11 may configure the SREG with the number of REs matching a maximum multiple of the number of antenna ports and not use other available REs (largest k REs). For example, in the SPDCCH transmission via four antenna ports, the base station 11 may exclude one to three REs from configuring the SREG.

Due to operation S150 of FIG. 15, the UE 12 may not expect reception of the SREG including a number of REs, wherein the number of REs is different from a multiple of the number of antenna ports, and components and/or operations for processing the SREGs may be omitted from the UE 12. In some embodiments, the UE 12 may not expect that the SPDCCH is allocated to the SREG overlapping with the CSI-RS. In some embodiments, when the number of available REs in the SREG is different from a multiple of the number of antenna ports, the UE 12 may consider that the SPDCCH is not allocated to the SREG. That is, the available REs may be used for mapping but not carry data.

Figure 16:
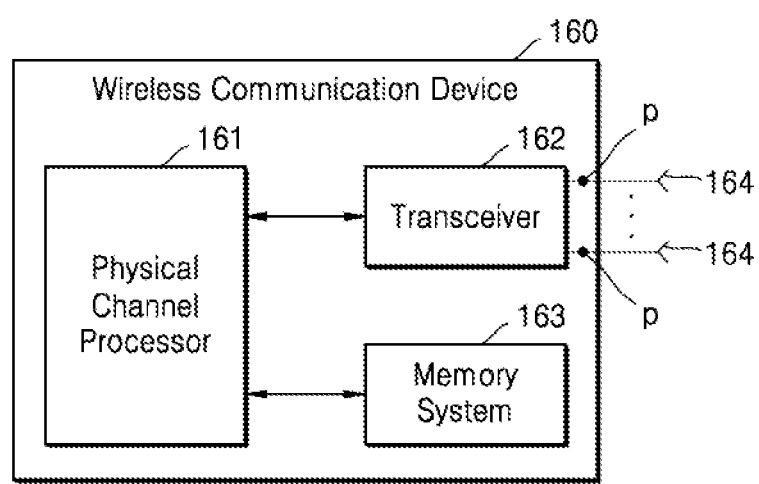
FIG. 16 is a block diagram of a wireless communication apparatus according to an example embodiment of the inventive concept.

FIG. 16 is a block diagram of a wireless communication apparatus 160 according to an example embodiment of the inventive concept. In some embodiments, the wireless communication device 160 shown in FIG. 16 may be an example of the UEs 12 and 102 respectively shown in FIG. 1 and FIG. 10. As shown in FIG. 16, the wireless communication device 160 may include a transceiver 162, a memory system 163, a physical channel processor 161, and a plurality of antennas 164. In some embodiments, at least two of the transceiver 162, the memory system 163, and the physical channel processor 161 may be included in one semiconductor package.

The transceiver 162 may be coupled to a plurality of antenna ports p connected to the antennas 164 and may transmit and receive a signal including control information and/or data with a base station via the antennas 164. The transceiver 162 may include a radio frequency (RF) transmitter performing up conversion and power amplification of a signal and an RF receiver performing down conversion and low-noise amplification. The transceiver 162 may provide, to the physical channel processor 161, a signal that is generated by processing a signal received via a wireless channel (for example, the DL channel), and may transmit, to the base station, a signal that is generated by processing the signal provided from the physical channel processor 161 via a wireless channel (for example, the UL channel).

The memory system 163 may store programs and data required for operations of the wireless communication device 160. The memory system 163 may include a semiconductor memory device such as a flash memory or a dynamic random access memory (DRAM), or include a storage medium such as a magnetic disc or an optical disc.

The physical channel processor 161 may control a series of processes such that a method of receiving the DL channel in the STTI described above with reference to the accompanying drawings is performed in the wireless communication device 160. For example, the physical channel processor 161 may perform at least one operation included in the method of receiving the DL channel in the STTI by executing the program (or instructions) stored in the memory system 163.

In some embodiments, when no RE in the SREG corresponds to a value identical to 'i' described in clause 6.3.4.3. of 3GPP TS 36. 211 [3] for including all of the SPDCCH candidates including SREG, it may be not required for the wireless communication device 160 as a user equipment to receive a CRS-based SPDCCH on the SREG included in at least one SPDCCH via four antenna ports.

In some embodiments, when no RE in the SREG corresponds to a value identical to 'i' described in clause 6.3.4.3 of 3GPP TS 36.211 for all of the SPDCCH candidates including the SREG, the wireless communication device 160 may, as a user equipment, skip decoding the CRS-SPDCCH candidates including SREGs included in at least one SPDCCH.

In some embodiments, when arbitrary REs correspond to different sub-matrixes, that is, a precoding sub-matrix described in precoding operations of clause 6.3.4.3 of 3GPP TS 36.211 [3], for a plurality of SPDCCH candidates, it may be not required to the wireless communication device 160 as a user equipment to receive the CRS-based SPDCCH on the SREG included in the plurality of SPDCCH candidates.

In some embodiments, when arbitrary REs in the SREG corresponds to different precoding sub-matrixes, that is, the precoding sub-matrix described in the precoding operation of clause 6.3.4.3. of 3GPP TS 36.211, for the plurality of SPDCCH candidates, the wireless communication device 160 may, as a user equipment, skip decoding of the CRS-based SPDCCH candidates including an SREG included in at least one SPDCCH via four antenna ports.

For the CRS-based SPDCCH via four antenna ports, when an arbitrary RE in the SREG includes precoding outputs having non-zero values in different antenna ports with respect to the plurality of SPDCCH candidates including an SREG, a processing method of the SREG may be dependent on implementation of the wireless communication device 160 as an user equipment. The precoding outputs may refer to precoding outputs described in the precoding operation of clause 6.3.4.3. of 3GPP TS 36.211.

Figure 17:
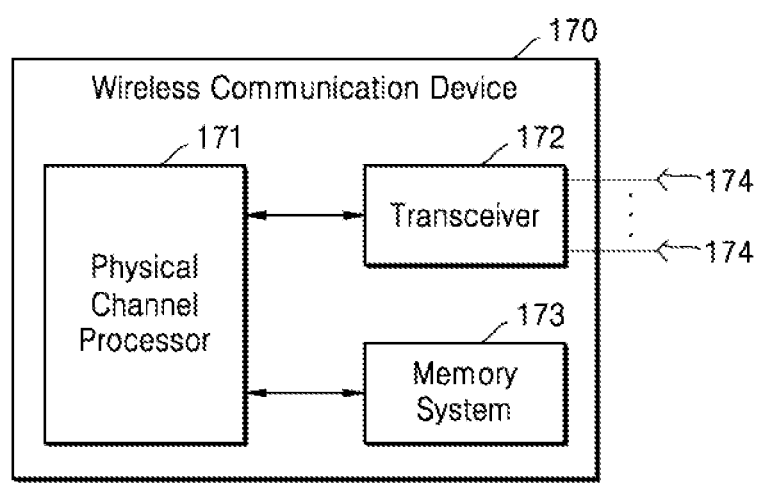
FIG. 17 is a block diagram of a wireless communication apparatus according to an example embodiment of the inventive concept.

FIG. 17 is a block diagram of a wireless communication device 170 according to an example embodiment of the inventive concept. In some embodiments, the wireless communication device 170 may be an example of the base stations 11 and 101 respectively shown in FIGS. 1 and 10. As shown in FIG. 17, the wireless communication device 170 may include a transceiver 172, a memory system 173, and a physical channel processor 171, and a plurality of antennas 174. In some embodiments, at least two of the transceiver 172, the memory system 173, and the physical channel processor 171 may be included in one semiconductor package. Hereinafter, in description regarding FIG. 17, redundant description of FIG. 16 will be omitted.

The transceiver 172 is coupled to the antennas 174 and may transmit and receive a signal including control information and/or data through the antennas 174 with the UE. The transceiver 172 may provide, to the physical processor 171, a signal that is generated by processing a signal received via a wireless channel (for example, the UL channel), and may provide, to the base station, a signal that is generated by processing the signal provided from the physical channel processor 171 via a wireless channel (for example, the DL channel).

The physical channel processor 171 may control a series of processes such that a method of receiving the DL channels in the STTI described above with reference to the accompanying drawings is performed in the wireless communication device 170. For example, the physical channel processor 171 may perform at least one operation included in the method of transmitting the DL channel in the STTI by executing the program stored in the memory system 173.

Methods according to example embodiments of the inventive concept may be implemented in the form of hardware, processing circuitry executing software, or combinations of the same. In some embodiments, when a method according to example embodiments of the inventive concept is implemented using software, a non-transitory computer-readable storage medium storing at least one program (software module) may be provided. At least one program stored in the computer-readable storage medium may be configured to be executable by at least one processor in an electronic device. The at least one program may include instructions that have the electronic device execute the methods according to example embodiments of the inventive concept.

In some embodiments, the program may be stored in a attachable storage medium that may be accessed through communication networks such as Internet, Intranet, Local Area Network (LAN), Wide LAN (WLAN), or Storage Area Network (SAN), or a communication network configured by combination thereof. The storage medium may access the device performing the method according to example embodiments via an external port. In addition, another storage device on the communication network may also access the device for performing the method according to example embodiments of the inventive concept.

While the inventive concept has been particularly shown and described with reference to embodiments thereof, it will be understood that various changes in form and details may be made therein without departing from the spirit and scope of the following claims.

What is claimed is:

1. A method of receiving a downlink control channel in a user equipment, the method comprising:
   receiving, using two or more antenna ports, a shortened physical downlink control channel (PDCCH) transmitted using a space-frequency block code (SFBC), by using at least one shortened control channel element (CCE) for shortened transmission time interval (TTI) transmission; and
   monitoring the shortened PDCCH, which comprises decoding candidates of the shortened PDCCH based on a SFBC and log likelihood ratio (LLR) calculation,
   wherein the at least one shortened CCE comprises at least one shortened resource element group (REG) comprising a number of allocated resource elements (REs), the number being unequal to an integer multiple of the number of the two or more antenna ports used for the receiving of the shortened PDCCH.

2. The method of claim 1, wherein the shortened PDCCH is a cell specific reference signal (CRS)-based shortened PDCCH.

3. The method of claim 2, wherein the at least one shortened REG comprises a resource element to which a channel state information reference signal (CSI-RS) is allocated.

4. The method of claim 2, wherein the at least one shortened REG comprises at least one RE that is not allocated to the shortened PDCCH.

5. The method of claim 1, wherein the shortened TTI is a slot-based shortened TTI or a subslot-based shortened TTI, and
   the receiving of the shortened PDCCH is performed under a time division duplex (TDD) mode when the shortened TTI is the slot-based shortened TTI.

6. The method of claim 1, wherein the shortened PDCCH is a signal transmitted by using an aggregation of a plurality of shortened CCEs that are mapped on a physical resource in a localized way or a distributed way.

7. The method of claim 1, wherein the at least one shortened REG comprises REs allocated to an even number of the shortened PDCCHs, and
   the number of the two or more antenna ports is four.

8. The method of claim 1, wherein the decoding of the candidates of the shortened PDCCH comprises:
   performing first decoding on a first port group of the two or more antenna ports by using REs allocated to the shortened PDCCH, based on the SFBC;
   performing second decoding on a second port group of the two or more antenna ports, which is different from the first port group, by using REs allocated to the shortened PDCCH, based on the SFBC; and
   obtaining an LLR of each of the candidates of the shortened PDCCH, based on results of the first decoding and the second decoding.

9. The method of claim 8, wherein a user equipment comprises a plurality of decoding blocks for carrier aggregation, and
   the decoding of the candidates of the shortened PDCCH further comprises:
   assigning the first decoding to a first decoding block of the plurality of decoding blocks; and
   assigning the second decoding to a second decoding block of the plurality of decoding blocks.

10. The method of claim 1, wherein the monitoring of the shortened PDCCH further comprises detecting the at least one shortened REG or the at least one shortened control channel element (CCE).

11. The method of claim 10, wherein, when the at least one shortened REG is detected, the decoding the candidates of the shortened PDCCH or the LLR calculation is performed.

12. The method of claim 10, wherein the decoding of the candidates of the shortened PDCCH comprises setting an LLR of the shortened PDCCH as zero when the at least one shortened REG is detected.

13. The method of claim 10, wherein the decoding of the candidates of the shortened PDCCH comprises decoding shortened REGs included in the candidates of the shortened PDCCH, and
    decoding the detected at least one shortened REG is omitted in the decoding of the shortened REGs.

14. The method of claim 10, wherein the decoding of the candidates of the shortened PDCCH comprises setting an LLR of the detected at least one shortened REG as zero.

15. The method of claim 1, further comprising transmitting, on uplink, information including whether the user equipment is capable of decoding the at least one shortened REG.

16. A method of receiving a downlink control channel in a user equipment, the method comprising:
    receiving, using two or more antenna ports, a shortened physical downlink control channel (PDCCH) by a space-frequency block code (SFBC), by using at least one shortened control channel element (CCE) for shortened transmission time interval (TTI) transmission; and
    monitoring the shortened PDCCH,
    wherein the at least one shortened CCE comprises a first shortened resource element group (REG) and a second shortened REG, the first shortened REG and the second shortened REG each comprising resource elements (REs) simultaneously precoded by a precoding matrix for the SFBC and being adjacent to each other.

17. A method of transmitting a downlink control channel in a base station, the method comprising:
    performing precoding for shortened physical downlink control channel (PDCCH) transmission, based on a precoding matrix for a space-frequency block code (SFBC) using four antenna ports;
    mapping precoded data to resource elements (REs); and
    transmitting the shortened PDCCH by using at least one shortened control channel element (SCCE) for shortened transmission time interval (STTI) transmission,
    wherein the mapping comprises mapping the precoded data to REs such that the at least one SCCE only comprises shortened resource element groups (REGs) allocated to a number of the shortened PDCCHs, wherein the number of the shortened REGs allocated to the shortened PDCCHs is identical to an integer multiple of four; and
    configuring each of the shortened REGs only with a number of REs identical to an integer multiple of four.

18. The method of claim 17, wherein the mapping comprises excluding RE mapping of a channel state information reference signal (CSI-RS) in cell specific reference signal (CRS)-based shortened PDCCH transmission via the four antenna ports.

19. A user equipment comprising:
    a transceiver;
    two or more antenna ports;
    a processor configured to execute instructions for:
        receiving, through the transceiver and the two or more antenna ports, a shortened physical downlink control channel (PDCCH) transmitted using a space-frequency block code (SFBC), by using at least one shortened control channel element (CCE) for shortened transmission time interval (TTI) transmission; and
        monitoring the shortened PDCCH, which comprises decoding candidates of the shortened PDCCH based on a SFBC and log likelihood ratio (LLR) calculation,
    wherein the at least one shortened CCE comprises at least one shortened resource element group (REG) comprising a number of allocated resource elements (REs), the number being unequal to an integer multiple of the number of the two or more antenna ports used for the receiving of the shortened PDCCH.

* * * * *